United States Patent Office 3,404,413
Patented Oct. 8, 1968

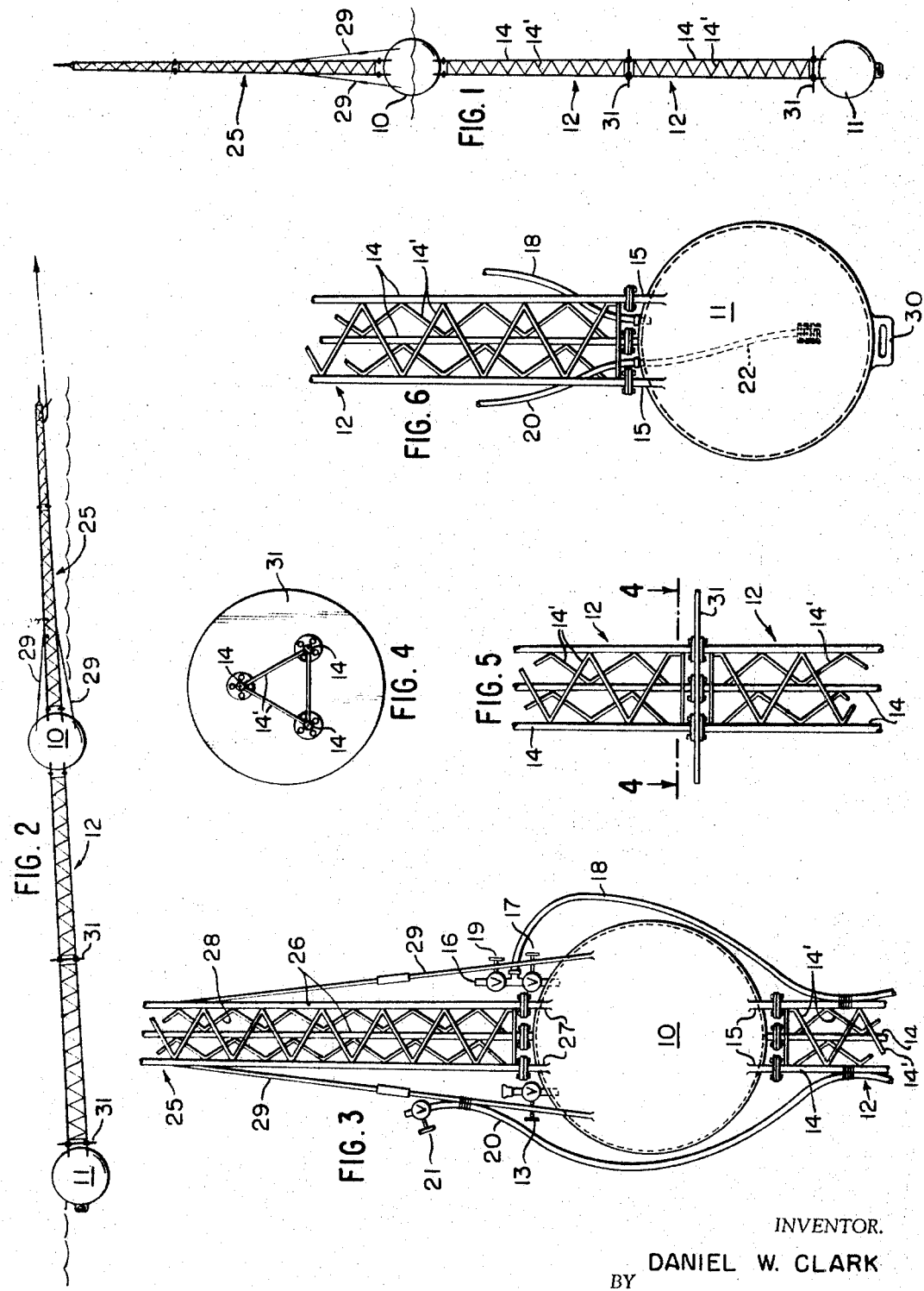

3,404,413
MOBILE MARINE STRUCTURE
Daniel W. Clark, 46 Millfield St.,
Woods Hole, Mass. 02543
Filed Jan. 19, 1967, Ser. No. 610,321
10 Claims. (Cl. 9—8)

ABSTRACT OF THE DISCLOSURE

A mobile and buoyant marine structure having a skeleton frame connecting correlated tanks of which one is a reservoir and source of compressed air power.

This invention comprises a new and improved buoyant structure for use in marine environment, for example, as a base for the study of ocean tides, currents and wave action or for off shore exploration and drilling. The structure is a self-contained unit that may be transported over land and manipulated upon the shore. It may be conveniently towed in prone position and erected at any selected bearing point by a crew of not more than three men with the establishment of a stable platform that may stand as much as thirty feet above the ocean level.

My novel structure is characterized by a pair of interrelated spherical tanks, one serving as a self-contained source of compressed air and the other serving optionally as a buoyancy tank or an erecting weight. The spherical tanks are advantageous from an engineering standpoint in that they have the maximum ratio of volume of surrace area, optimum shape for maintaining internal pressure and finally they act as rollers for the whole structure by which it may be conveniently transported from one position to another on the shore.

These and other features of the invention will be best understood and appreciated from the following description of a preferred embodiment thereof selected for purposes of illustration and shown in the accompanying drawings in which—

FIG. 1 is a view in elevation on a reduced scale,

FIG. 2 is a similar view of the structure in prone position for towing,

FIG. 3 is a fragmentary view on a larger scale of the intermediate portion of the device, FIG. 4 is a view in cross section on the line 4—4 of FIG. 5, and FIGS. 5 and 6 are fragmentary views of portions of the device.

A structure typical of my invention as herein shown comprises a spherical compresed air tank 10 and a spherical buoyancy tank 11 connected by an intermediate skeleton frame 12. The tanks may be of steel or other metal and about four or five feet in diameter. In practice the tank 10 is maintained at all times under a full charge of compressed air at about 75 p.s.i. and so serves as a reservoir self-contained in the structure and source of power for the whole device. The tank 10 is provided with an inlet charging valve 13 at a convenient point in its upper spherical surface.

The connecting skeleton frame 12 comprises three long rods 14 bolted at their ends respectively to bosses 15 welded to the opposed convex surfaces of the spherical tanks. The rods 14 are arranged in triangular pattern of substantially less cross sectional area than that of the tanks and the frame is stiffened and reinforced by one or more interior helices 14' of strip metal. The described relation of frame to sphere is important in that it permits the whole structure to be rolled transversely upon the two spheres without any dragging of the frame.

The spherical tank 10 has let into its upper surface a pipe 16 provided with a valve 17 through which the pipe communicates with a compressed air hose 18 leading down to the top of the bouyancy tank 11. Above its hose connection the pipe 16 has an outlet valve 19 which, of course, is closed when compressed air is being passed to the hose 18. The valve 19 may be opened to permit the escape of exhaust air from the tank 11 while the valve 17 remains closed and the tank 11 is filling.

An intake hose 20 has at its upper end a valve 21 and this is maintained in convenient position for manipulation near the top of the tank 10. The hose 20 is extended down into the tank 10 through a flexible strainer section 22 which always falls to the lower side of the tank when the structure is in prone position, thus creating inward flow of water through the hose 20 by syphon action for erecting the structure.

An overhead skeleton spire-like tower 25 rises from the spherical tank 10. It comprises three long straight rods 26 arranged in triangular formation and bolted at their lower ends to bosses 27 projecting from the shell of the tank 10. The tower is reinforced and stiffened by inner helices 28 of strip stock and supported externally by guy cables 29 secured at their lower ends to the tank. It will be noted that the body of the tower is less in cross-sectional area than that of the spherical tank 10. The tower 25 may extend 30 to 40 feet above the tank and be provided near its upper end with a crow's nest or cage for any desired recording instrument. It serves also as a conspicuous marking buoy or beacon.

The buoyancy sphere 11 is provided in its bottom with a perforated or slotted lug 30 for the attachment of ballast by which the device may be anchored at any selected bearing.

While the spherical tanks 10 and 11 have been constructed of steel in structures up to an over-all length of 80 feet, aluminum, glass, cloth or other lighter materials may be employed within the scope of this invention for structures of smaller size.

One or more damping plates 31 may be incorporated in the connecting frame 12 to reduce up and down heaving of the floating structure.

When the lower or buoyancy tank 11 is exhausted the structure assumes a prone position as shown in FIG. 2 in which it may conveniently be towed to any desired location. When it is desired to erect the structure the valve 17 is closed, the valve 16 opened and the valve 21 open and submerged. Water will thereupon flow through the hose 18 to the buoyancy tank 11 while air escapes therefrom through the hose 20. The structure thus gradually rights itself, floating in upright position as shown in FIG. 1 with the compressed air tank at the water level where the four controlling valves may be conveniently reached for manipulation.

The tower is shown as terminating in a sleeve or rod on which may be mounted a crow's nest for an observer or any desired recording instrument.

Having thus disclosed my invention and described in detail an illustrative embodiment thereof, I claim as new and desire to secure by Letters Patent:

1. A mobile marine structure comprising an elongated skeleton frame having a buoyancy tank fast at one end and a compressed-air tank fast in an intermediate control position, tubular valved connections between the two tanks whereby the buoyancy tank may be exhausted by compressed air supplied from the compressed air tank, the compressed-air tank and the buoyancy tank being of spherical shape and so located in the structure that when the buoyancy tank is filled with water, the compressed-air tank will float at ocean level and that valves are located upon the said spherical compressed-air tank for controlling the exhausting and filling of the buoyancy tank.

2. A mobile marine structure as defined in claim 1, further characterized in that the compressed-air tank has an independent valve inlet for the admission thereof of compressed air for establishing a self-contained charge.

3. A mobile marine structure as defined in claim 1, further characterized in that a compressed-air hose leads from the intermediate compressed-air tank to the said buoyancy tank, and an exhaust hose leads from the buoyancy tank to an outlet valve located adjacent to the said compressed-air tank.

4. A mobile marine structure as defined in claim 1, further characterized in that the compressed-air tank and the buoyancy tank are of circular formation whereby the whole structure may be rolled on land from one place to another.

5. A mobile marine structure as defined in claim 1, further characterized in that the buoyancy tank has an inlet hose terminating within the tank and being flexible whereby its intake end will always seek the lowermost possible position within the tank for creating an inflowing syphon action.

6. A mobile marine structure as defined in claim 1, further characterized in that the structure comprises an elongated skeleton frame of metal rods, and includes spaced damping plates disposed at right angles to the longitudinal axis of the skeleton frame.

7. A mobile marine structure as defined in claim 1, further characterized in that the buoyancy tank and the compressed-air tank are of substantially the same diameter and these are connected by an elongated skeleton frame which is less in enclosed cross sectional area throughout its length than the cross sectional area of either spherical tank.

8. A mobile marine structure as defined in claim 1, further characterized in that the skeleton frame is attached to both tanks at their opposed convex sides and within the maximum circumferential circle thereof.

9. A mobile marine structure as defined in claim 1, further characterized in that an elongated skeletal tower is secured at its lower end to the upper convex surface of the spherical compressed-air tank and projects upwardly beyond the tank when the structure is in erected position.

10. A mobile marine structure as defined in claim 1, further characterized in that it has an elongated sleeve member which extends upwardly from the buoyancy sphere for holding recording instruments above sea level when the structure is in upright position.

References Cited

UNITED STATES PATENTS

| | | | |
|---|---|---|---|
| 3,166,977 | 1/1965 | Pickett et al. | 9—8 X |
| 2,256,537 | 6/1966 | Clark | 9—8 |
| 3,339,511 | 9/1967 | Daniell | 114—0.5 |

MILTON BUCHLER, *Primary Examiner.*

TRYGVE M. BLIX, *Assistant Examiner.*